No. 663,633. Patented Dec. 11, 1900.
F. H. MASON.
PNEUMATIC TIRE.
(Application filed Mar. 9, 1900.)
(No Model.) 2 Sheets—Sheet 1.
Fig. 1
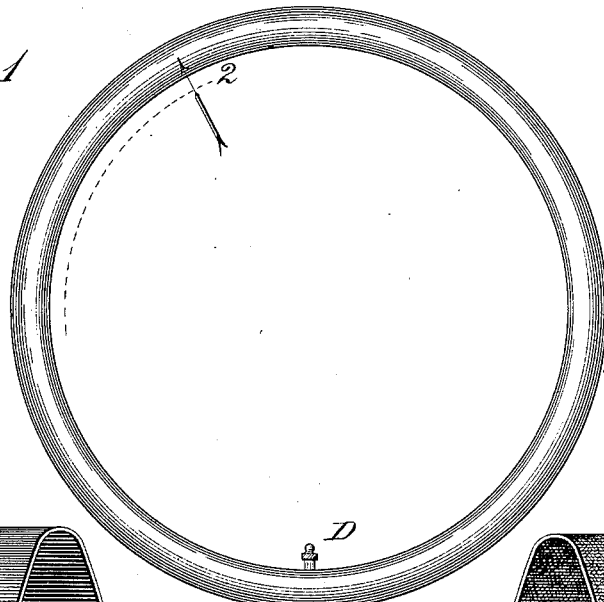
Fig. 9. Fig. 8.
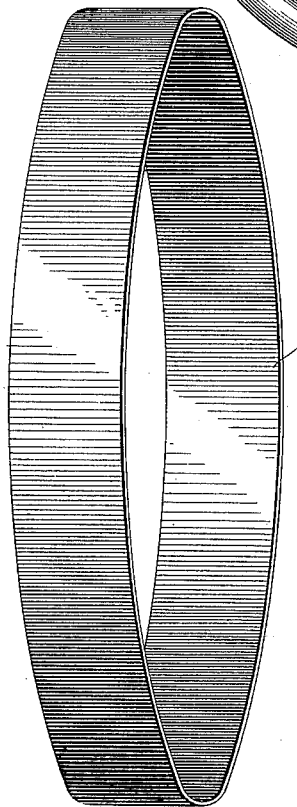 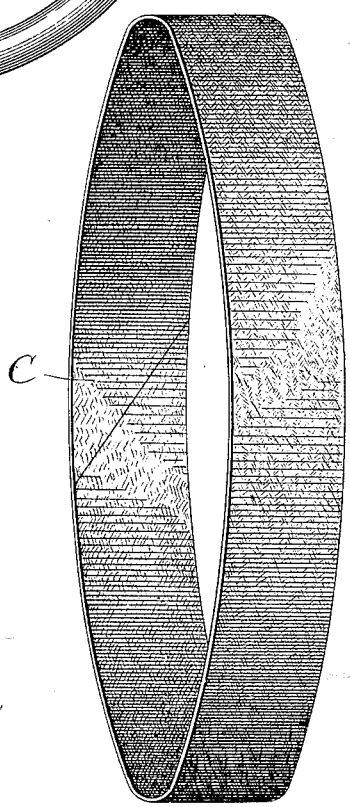
Witnesses: Inventor:
Chas. E. Gaylord, Frank H. Mason,
John Enders Jr. By Dyrenforth, Dyrenforth & Lee,
Att'ys.

No. 663,633. Patented Dec. 11, 1900.
F. H. MASON.
PNEUMATIC TIRE.
(Application filed Mar. 9, 1900.)
(No Model.) 2 Sheets—Sheet 2.
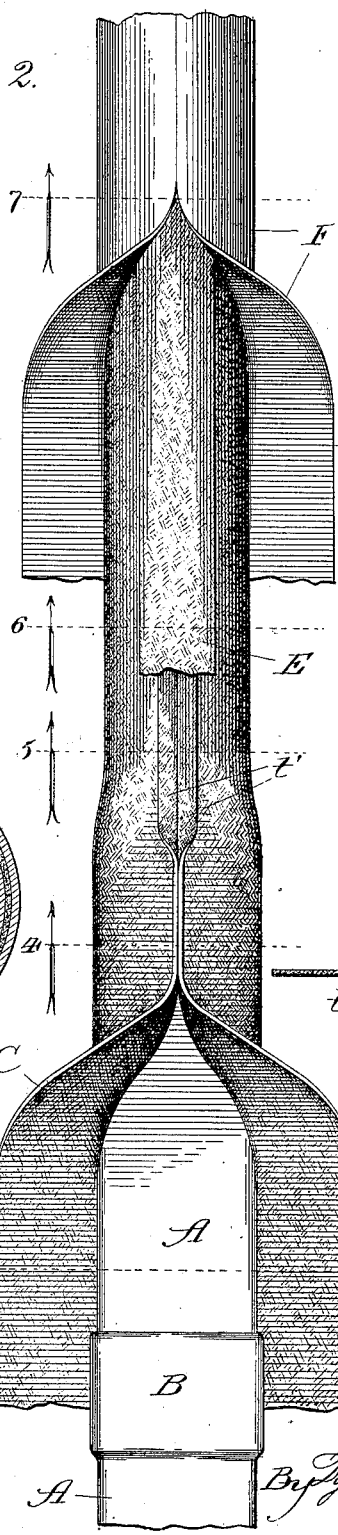
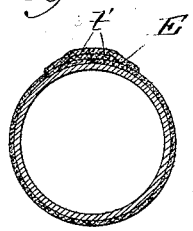
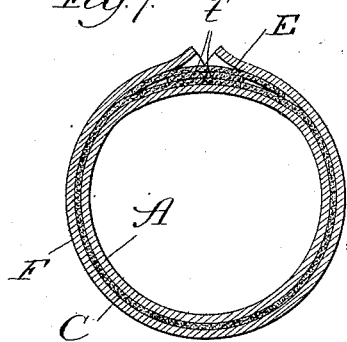
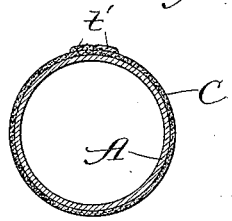
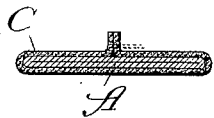
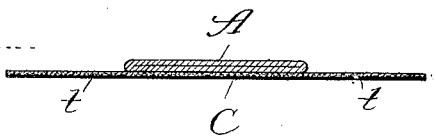
Witnesses:
Chas. E. Gaylord,
John Enders Jr.
Inventor:
Frank H. Mason,
By Dyrenforth, Dyrenforth & Lee,
Attys.

UNITED STATES PATENT OFFICE.

FRANK H. MASON, OF AKRON, OHIO.

PNEUMATIC TIRE.

SPECIFICATION forming part of Letters Patent No. 663,633, dated December 11, 1900.

Application filed March 9, 1900. Serial No. 7,975. (No model.)

*To all whom it may concern:*

Be it known that I, FRANK H. MASON, a citizen of the United States, residing at Akron, in the county of Summit and State of Ohio, have invented a new and useful Improvement in Pneumatic Tires, of which the following is a specification.

My invention relates to an improvement in pneumatic tires of the class which employ in their construction rubber and fabric, and more particularly to that class of pneumatic tires known as "single-tube" tires. The pneumatic tires embodying my invention may be used on bicycles or other velocipedes, as well as on vehicle-wheels of all kinds—such as automobiles, wagons, carriages, motocycles, &c.

Heretofore in the construction of the single-tube pneumatic tire it has been deemed essential in practice to build up the tire-tube with an inner lining or tube of rubber, an intermediate layer of strain-resisting fabric, and an outer tubing of rubber, and thereupon to join the ends of the several component parts together and effect the permanent union at the joints and between the component parts by vulcanization, to which end the rubber tubes referred to were employed in an unvulcanized state in building the tire. It has been urged, however, that the act of vulcanizing the cloth or fabric which constitutes the strain-resisting element or the tire has a deleterious effect upon the fiber, whereby it does not present to the utmost or even to the required degree the strength and rigidity desirable in this element. It is further recognized, moreover, among tire-manufacturers that the act of producing the joint whereby the straight tubing is formed into an annulus is where the elements are joined in an unvulcanized state and subsequently vulcanized—an operation requiring considerable care. It is further well known that any defects occurring in the inner tube which are difficult of detection when the inner tube is vulcanized within a permanent covering can be easily discovered if means for examining the tube free from its covering can be afforded. In all constructions of single-tube tire with which I am familiar this opportunity for examining the inner tube after vulcanization is lacking.

It has heretofore been suggested that a single-tube tire may be made by cementing together layers of unvulcanized rubber and fabric, the ends being joined after vulcanization by cementing, this form of tire, popularly called the "Boothroyd," having been among the first of the single-tube variety and having had a somewhat limited career. Among the forms of double-tube tire the earlier construction of the Dunlop employed an inner detachable tube of vulcanized rubber made endless and an outer detachable cover in the form of an endless band of rubber having a layer of fabric cemented or vulcanized upon its inner surface. It has, so far as I am aware, however, been deemed impracticable to use in the construction of single-tube tires the method of combining the elements practiced in the manufacture of the double-tube detachable tire.

The object of my invention is to produce a single-tube tire for bicycles and other vehicles the elements of which shall be united into a single endless tube without employing vulcanization for this purpose and without any vulcanization subsequent to the union of the elements.

The further object of my invention is to produce a single-tube tire which shall be free of any of the objections above pointed out and which may be more economically produced than other single-tube tires now known.

To these ends my invention consists in a single-tube tire composed of a vulcanized inner endless air-tube, an intermediate tubular endless layer of fabric, and an outer endless tube of vulcanized rubber, the parts being united by cementing and without vulcanization.

My invention further consists in the preferred method of assembling and uniting the elements of the tire, as hereinafter set forth, and my invention further consists in the preferred general and specific details of construction and combinations of parts, all as hereinafter set forth.

In the drawings, Figure 1 is a view in elevation of a single-tube pneumatic tire embodying my improvements. Fig. 2 is a view illustrating the various steps in the manufacture of the tire in accordance with my invention. Fig. 3 is a cross-section on the line 3 of Fig. 2. Fig. 4 is a cross-section on the line 4 of Fig. 2. Fig. 5 is a cross-section on the line 5 of Fig. 2. Fig. 6 is a cross-section on the line 6 of Fig. 2. Fig. 7 is a cross-section on the line 7 of Fig. 2. Fig. 8 is a view of the endless band of fabric, and Fig. 9 is a view of the endless outer rubber band which constitutes the outer layer of the tubing.

In explanation of Fig. 2 of the drawings it should be understood that the length of tubing embodied in said figure is a section of an endless tire and that the various cross-sectional views illustrate the step-by-step condition of the tire being manufactured.

A represents the inner tube, which may be made in any manner found most desirable, either by joining a calendered strip into tubular form or by the well-known method of producing seamless tubing on a tubing-machine or otherwise. The tube A may, moreover, be of any thickness and size desired. Thus for bicycle-tires the inner tube will ordinarily be comparatively thin, with an internal diameter of, say, one inch or a little more, while in the case of an automobile-tire the tubing will be ordinarily much thicker and of greater diameter. The tube A is vulcanized in a straight length and preferably upon a straight mandrel. Either before or after vulcanizing the tube is cut to the length desired in the pneumatic tire, and then after vulcanizing the ends are joined by telescoping one into the other, as illustrated at B, Fig. 2, the joint being made secure by the use of cement. It will involve no departure from my invention, however, to join the ends of the tube A before vulcanization or in any other suitable manner after vulcanization. The inner rubber tube A having thus been produced, I next prepare an endless band of suitable fabric, such as duck, by forming it into an endless strip of suitable width, more than enough to envelop the tube A, and apply to the inner face of this fabric a coating of rubber cement. To make the fabric C, I may either weave a tube with the diameter desired in the band and cut the tube into transverse sections of the desired width of the band, or I may take a strip of fabric of the desired width and cut either on the bias or straight and join the ends to produce an endless band of the proper diameter by stitching, cementing, lacing, or otherwise. This endless band, cemented as described, is placed beneath the tube A, which is firmly rolled down upon the band, so as to be united to the latter along its central line, as indicated in cross-section in Fig. 3. The free edges $t$ of the band C are then brought together, as indicated in Fig. 4, and stitched on an ordinary stitching-machine to produce an endless tube of fabric internally solutioned and presenting along one inner circumferential face the flaps $t'$. The outer sides of these flaps $t'$ are thereupon provided with solution and the inner tube is inflated through the medium of the valve D, which had previously been supplied to the inner tube in the usual manner. The effect of inflation is firmly to cement the inner tube to the tube of fabric. At this time also the flaps $t'$ are rolled down, and over the flaps is placed a strip E of fabric which is solutioned on its under face. This is illustrated in Fig. 6. I now prepare an endless band of vulcanized rubber having the thickness desired in the outer rubber covering of the tube and, if desired, also made thicker in one part than in another, this band being by preference made endless before vulcanization, after the manner common in the outer covering of detachable tires. The inner surface of this band F is coated with solution and applied to the partially-completed tire-tube in such a manner that the meeting edges of the band are presented at the seating side of the tire. To make the union more perfect, the elements are rolled firmly together while the inner tube is inflated. The inflating of the inner tube for this purpose may, however, be dispensed with.

Where the exigencies require the use of greater reinforcement than can be obtained with a single layer of fabric, more than one layer may be employed, and by preference each layer is independently sewed up into an endless tube before the next layer is applied thereto, and by preference also the line of the joint produced by sewing is not made coincident in the various layers. It will, however, be no departure from my invention to unite several layers in a tube in one sewing operation. Where the nature of the fabric forbids sewing to be practiced, other means of effecting the joint which forms the fabric into an endless tube may be employed, and such other means may be used in any event.

In a tire embodying the above construction it will be observed that the inner tube A may be made and tested for flaws before incorporating it in the tire. The strain-resisting fabric C is at no time subjected to the deleterious effect of vulcanization. The outer tube or layer may be vulcanized under the most favorable conditions, as on a drum, and all the elements of the tire may be, and do become, securely united to each other by the simple operations of inflating and applying hand-roller pressure.

In case of puncturing the tire in use the puncture can be repaired in the same manner now practiced with other single-tube tires—namely, by injecting cement into the puncture or by inserting and vulcanizing a patch or by introducing a plug.

What I claim as new, and desire to secure by Letters Patent, is—

1. The method of producing a single-tube pneumatic tire, which consists in forming an endless inner tube of vulcanized rubber, applying and cementing thereto an endless band of fabric, stitching the edges of the fabric to form a tube, cementing upon the joined edges a protection-strip of fabric, and applying to the tube of fabric and cementing thereto a tube of vulcanized rubber, substantially as described.

2. In the manufacture of a pneumatic tire, substantially as described, the method of producing an inner vulcanized tube with an unvulcanized endless tubular covering of fabric cemented thereto, which consists in first forming an endless vulcanized rubber tube, then forming an endless band of fabric having cement upon one surface, firmly uniting the rubber tube to the band along the center of the latter, uniting, as by sewing, the edges of the band to form an endless tube, and thereupon inflating the inner tube, to cause it to be united to the remaining surface of the band, all as set forth.

3. A pneumatic tire, comprising the inner endless vulcanized rubber tube A, provided with a valve D, the outer endless vulcanized rubber tube F, the intermediate unvulcanized reinforcing fabric C, having its edges united to form a tube, and the joint-protecting strip E, the elements being united together by cement without vulcanization, substantially as described.

4. A single-tube pneumatic tire, comprising an inner vulcanized endless tube of rubber, an outer vulcanized endless band having its edges joined on the seating side of the tire, and an intervening reinforcing fabric of unvulcanized material consisting of one or more layers of fabric made endless and joined as by stitching on the seating side of the tire, the various elements being united by cement without vulcanization, substantially as described.

FRANK H. MASON.

In presence of—
D. W. LEE,
A. D. BACCI.